Patented May 29, 1951

2,555,024

UNITED STATES PATENT OFFICE 2,555,024

LAURYL PYRIDINIUM 2-(5-CHLOROBENZO-THIAZYL)-SULFIDE

Lester A. Brooks, Norwalk, Conn., assignor to R. T. Vanderbilt Company, Inc., New York, N. Y., a corporation of New York No Drawing. Original application February 7, 1947, Serial No. 727,273. Divided and this application May 31, 1950, Serial No. 165,370

1 Claim. (Cl. 260—296)

I have invented a new chemical compound not hitherto known which exhibits unusual fungicidal activity.

The new compound which I have invented is lauryl pyridinium 2-(5-chlorobenzothiazyl)-sulfide, a compound of the formula:

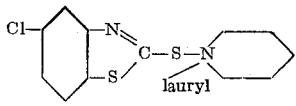

As a general method, I prepare this new compound by reacting a lauryl pyridinium salt with 5-chloro-2-mercaptobenzothiazole. The reaction is conveniently effected in aqueous solution. Dilution, when the reaction is effected in aqueous solution, is not important except that excess water involves a separation of a corresponding excess quantity of water to recover a dry product. The reaction requires equal molecular quantities of the reactants. In aqueous solution, the reaction is a simple metathesis occurring at ordinary temperatures. When the reaction is effected in aqueous solution, the product is separated from the aqueous salt solution in any convenient manner.

For example, lauryl pyridinium 2-(5-chlorobenzothiazyl)-sulfide can be prepared as follows: 10 grams (0.05 mol) of 5-chloro 2-mercaptobenzothiazole is neutralized with 90 cc. of 0.5618 normal sodium hydroxide. The clear solution is then added to a solution of 14 grams (0.05 mol) of lauryl pyridinium chloride dissolved in 150 cc. of water. An immediate precipitate forms and there is obtained by filtering a quantitative yield of a waxy yellow solid product.

I have also found that lauryl pyridinium 2-(5-chlorobenzothiazyl)-sulfide, for example, can be prepared by reacting equimolar quantities of sodium hydroxide and lauryl pyridinium chloride to form lauryl pyridinium hydroxide and then reacting this with an equimolar quantity of 5-chloro 2-mercaptobenzothiazole at moderately elevated temperature.

The new compound of my invention is an effective fungicide in very low concentrations. Specifically, this compound has exhibited its characteristic fungicidal activity against *Aspergillus niger*, *Gymnosporangium juniperivirginianae*, *Chaetomium globosum*, *Metarrhizium glutinosum* and *Penicillium*. Of these organisms *Aspergillus niger* has in general proven most resistant and I have therefore chosen it to illustrate this special activity in the following table. In this table, opposite the name of the particular compound, I have indicated the minimum concentration effective in parts per million of an aqueous medium under MLD (minimum lethal dose) the concentration required to prevent germination and under R (retarding dose) the minimum concentration required to limit germination to 5% as maximum of cultures of *Aspergillus niger* incubated at 30° C. for 72 hours in a nutrient solution comprising 40 grams of dextrose, 2 grams of asparagine, 0.5 gram of dihydrogen potassium orthophosphate, 0.25 gram of magnesium sulfate with 7 molecules of water crystallization and 0.0003 gram of thiamine chloride per five liters of water.

|  | *Aspergillus niger* | |
| --- | --- | --- |
|  | MLD | R |
|  | *Parts per million* | |
| Lauryl pyridinium 2-(5-chlorobenzothiazyl)-sulfide | 50 | 30 |

Lauryl pyridinium 2-(5-chlorobenzothiazyl)-sulfide is slightly soluble in water.

My new compound is soluble in acetone, methyl alcohol, ethyl alcohol, isopropyl alcohol, methyl ethyl ketone, methyl acetate, ethyl acetate, the monoethyl ether of ethylene glycol and the monomethyl ether of ethylene glycol and is insoluble in straight run gasoline (70–72° API) and in benzene and is slightly soluble in diethyl ether. In addition, my new compound is insoluble in carbon tetrachloride.

The new compound of my invention is of special value, for example, in application to textiles to render the textiles proof against mildew or other fungus attack. This compound is conveniently applied to textiles by dissolving it in acetone, diluting this solution with from 1 to 3 volumes of water per volume of acetone, dipping the textile in this acetone-water mixture or spraying it upon the textile, and drying the textile. Effective amounts of the new compound in the range of from 0.01% to about 0.5% by weight on the textile can be deposited upon the textile in this manner. Textiles exhibit a high retention for this new compound, perhaps because of its waxy nature.

This application is a division of my copending application Serial No. 727,273, filed February 7, 1947.

I claim:

Lauryl pyridinium 2-(5-chlorobenzothiazyl)-sulfide.

LESTER A. BROOKS.

REFERENCES CITED

The following references are of record in the file of this patent:

UNITED STATES PATENTS

| Number | Name | Date |
|---|---|---|
| 2,014,421 | Baird | Sept. 17, 1935 |
| 2,024,606 | Sebrell | Dec. 17, 1935 |
| 2,104,068 | Baird | Jan. 4, 1938 |
| 2,123,845 | Cramer | July 12, 1938 |
| 2,437,170 | Minich | Mar. 2, 1948 |

FOREIGN PATENTS

| Number | Country | Date |
|---|---|---|
| 457,477 | Great Britain | 1936 |